(12) United States Patent
Wimberley

(10) Patent No.: US 7,954,774 B2
(45) Date of Patent: Jun. 7, 2011

(54) TILT FACE STEP

(76) Inventor: Clay David Wimberley, Arlington, VA (US)

( * ) Notice: Subject to any disclaimer, the term of this patent is extended or adjusted under 35 U.S.C. 154(b) by 572 days.

(21) Appl. No.: 11/648,933

(22) Filed: Jan. 3, 2007

(65) Prior Publication Data

US 2007/0164175 A1    Jul. 19, 2007

Related U.S. Application Data

(60) Provisional application No. 60/755,932, filed on Jan. 3, 2006.

(51) Int. Cl.
   *F16M 11/04*    (2006.01)
(52) U.S. Cl. .............. 248/187.1; 248/177.1; 248/185.1
(58) Field of Classification Search .............. 248/178.1, 248/179.1, 187.1, 176.3, 291.1, 292.12; 359/399, 359/409; 396/428, 421; 403/96, 97, 146, 403/147; 411/538, 539
   See application file for complete search history.

(56) References Cited

U.S. PATENT DOCUMENTS

| | | | |
|---|---|---|---|
| 3,661,376 A | 5/1972 | Hill | |
| 4,044,982 A | 8/1977 | Miller | |
| 4,083,524 A | 4/1978 | O'Connor | |
| 4,457,610 A | 7/1984 | Kawazoe | |
| 4,614,452 A * | 9/1986 | Wang | 403/27 |
| 4,648,698 A | 3/1987 | Iwasaki | |
| 4,886,230 A | 12/1989 | Jones | |
| 5,708,890 A | 1/1998 | Nakano | |
| 5,725,187 A * | 3/1998 | Vo | 248/178.1 |
| 6,052,937 A * | 4/2000 | Morong | 43/21.2 |
| 6,445,498 B1 | 9/2002 | Baun | |
| 6,540,185 B2 * | 4/2003 | Ishikawa et al. | 248/187.1 |
| 6,805,513 B2 * | 10/2004 | Marquina | 403/107 |
| 6,824,319 B1 * | 11/2004 | Speggiorin | 396/428 |
| 7,021,592 B2 | 4/2006 | Brandes | |
| 7,025,313 B2 * | 4/2006 | Ma | 248/177.1 |
| 7,523,904 B2 * | 4/2009 | Carnevali | 248/278.1 |
| 2006/0138289 A1 * | 6/2006 | Speggiorin | 248/163.1 |
| 2006/0175483 A1 * | 8/2006 | Osaka | 248/177.1 |

* cited by examiner

*Primary Examiner* — Tan Le

(74) *Attorney, Agent, or Firm* — Robert Platt Bell

(57) ABSTRACT

A step is cut into a stationary or movable flange in a two-flange engagement. As the two flanges are brought closer to one another by tightening a nut or knob attached to a central shaft, contact is established along the edge of the step. Contact along this line does not create a point contact about which the flanges will pivot. Therefore, consistent friction is obtained when tension is applied by tightening the nut and the flanges are brought into contact.

14 Claims, 6 Drawing Sheets

TILT FACE STEP

CROSS-REFERENCE TO RELATED APPLICATIONS

The present application claims priority from Provisional U.S. Patent Application Ser. No. 60/755,932, filed Jan. 3, 2006, and incorporated herein by reference in its entirety.

FIELD OF THE INVENTION

The present invention relates to precision instruments or similar devices wherein two more or less parallel flanges, connected by a central shaft, are brought together to stop relative movement between the flanges. An example of an application for the present invention would be in a tripod head for a long telephoto lens with attached camera (lens/camera) or a telescope.

BACKGROUND OF THE INVENTION

A number of devices are known in the art to provide rotational alignment or other functions for instruments and the like. U.S. Pat. No. 7,021,592, incorporated herein by reference, includes a flat on a particular face, but it is only used when the device is being stored, not when it is being used. U.S. Pat. No. 6,445,498, incorporated herein by reference, has four knife-edges used to provide rotational alignment of a finder scope. U.S. Pat. No. 6,824,319, incorporated herein by reference, shows two serrated surfaces that interlock with one another. This arrangement eliminates the option of infinite variability of the orientation of the two flanges to one another.

Precision instruments or similar devices may employ a geometry wherein two more or less parallel flanges, connected by a central shaft, are brought together to stop relative movement between the flanges. An example of an application for this would be in a tripod head for a long telephoto lens/camera or a telescope. FIG. 9 illustrates this feature in a tripod head manufactured by Wimberley, Inc. of Winchester Va., assignee of the present application. In FIG. 9, a camera, telescope, or other device 990 (here illustrated as a camera with telephoto lens) may be attached to tripod 990 by means of a tripod head. The tripod head includes a vertical pivot having a rotary axis in the horizontal plane.

The vertical (tilt) pivot includes a movable flange 930 coupled to the camera or telescope 990, and a stationary flange 910 coupled to the tripod head. A knob, nut, or other tightening member 960 may be used to control tension on shaft 920, which pulls movable flange 930 into contact with stationary flange 910 to lock the two flanges together. As can be appreciated by one of ordinary skill in the art, in a situation where a high magnification lens (such as shown) is being used, a user may wish to adjust the vertical angle of the lens to track a target or frame a shot. It would be preferable if a user could move the apparatus in a controlled fashion so as not to overshoot the target or lose a shot.

Note that the term flange is used in the present application for convenience. In the drawings, what is called the stationary flange might alternatively be called a stationary cylindrical housing. The movable flange might be called a movable disk. The term flange captures the fact that each body has a flat surface that is perpendicular to the axis of the shaft or bearing bore, and that the two surfaces mate with one another.

FIG. 1 is a cross-section view of a Prior Art apparatus illustrating the stationary flange 110, movable flange 130, and connecting shaft 120. This type of apparatus may be used to mount a lens, telescope, or other instrument (or other application) at surface 180, for example, on moving flange 130. A nut, knob, or the like may be threaded to shaft 120 (threads omitted for clarity) at point 160 to pull shaft 120 in direction 170 to tighten the assembly. (Other methods, that may or may not require the use of threads on shaft 120, may also be used to pull the shaft in direction 170.)

Note that there is not a tight fit between the bearing surfaces 140A, 140B and shaft 120. The weight of moveable flange 130 and the attached apparatus create a cantilever situation wherein the shaft and flange rotate clockwise until they are constrained by the bearing surfaces 140A and 140B at 190A and 190B. Flanges 110 and 130 may be of the same or different material. A washer, generally of a material different from that of flanges 110 and 130 may be placed between the two flanges 110, 130, at surfaces 150A and 150B. This washer is omitted for clarity in the Figures. FIG. 1 shows the two flanges 110 and 130 far enough apart such that moving flange surface 150B does not touch stationary surface 150A.

FIG. 2 is a cross-section view of a Prior Art apparatus illustrating the two flanges 110, 130 and connecting shaft 120, where the two flanges 110, 130 are just touching at the bottom. This condition occurs as a little tension is placed on the mechanism by tightening the nut or knob (not shown) at the end of shaft 120. A telescope (or other instrument) may be attached to movable flange 130 as illustrated in FIG. 9. An operator may be looking through the telescope. In the condition established in FIG. 1, motion is fairly predictable. As the operator begins to rotate the telescope about a horizontal axis, thus moving the front of the telescope up or down, shaft 110 may first roll up the side of the bearing slightly but will then slip in the bearing and rotate in a way that is consistent with the expectations of the operator. The two components of the mechanism are touching only where shaft 110 contacts bearing surfaces 140A, and 140B at areas 190A and 190B.

In the condition shown in FIG. 2, however, in addition to the contact between the shaft 120 and bearing surfaces 140A, 140B, there is now contact between flange surfaces 150A, 150B. As the movable flange 130 is brought close to the stationary flange 110 by the knob or other tightening mechanism (not shown), contact between the two flanges 110, 130 occurs at a small area (henceforth sometimes called a point) at the bottom of the two flanges 110, 130. In this condition of slight preload wherein the flanges 110, 130 are just touching, the resistance characteristics of the mechanism are quite variable. Initially, the two flanges 110, 130 might be said to stick together at the contact point resisting slipping between one flange and the other. Whereas there is quite a bit of resistance to wholesale slipping between the two flanges 110, 130, there is very little resistance to rotation about this small contact area (actually a lesser sort of slipping).

As a very tiny amount of rotation about the contact point occurs, shaft 120 moves slightly in its housing perpendicular to the plane of the paper of FIG. 2. This initial movement creates very little resistance. When shaft 120 contacts the side of the bearing and can no longer move, the rotation about the contact point ceases and the flanges 110, 130 are forced to rotate past one another. This secondary resistance is much greater because it involves the rubbing of two nearly parallel surfaces contacting at a small area as they move past one another.

Thus, in this state of slight preload, which is typical for the operation of a tripod head, the operator experiences a short period of low resistance to rotation followed by a significant increase in resistance. Each time the operator begins a new adjustment after releasing the lens/camera, he or she experiences the same transition between low resistance and high resistance. This transition results in jerky movement and makes it difficult to accurately aim the lens. Furthermore, when the mechanism is resting in this state of slight preload the connection between the moving flange and the stationary flange is weak with regard to a tiny amount of rotation (the initial low resistance condition). If the mechanism is a tripod head, the connection between the lens/camera and its supporting structure in this condition may be relatively weak. To the extent that the lens/camera is not held solidly, the ability to take sharp, non-blurry, photographs is reduced.

SUMMARY OF THE INVENTION

In the present invention, a step is cut into the stationary or movable flange. As the two flanges are brought closer to one another by tightening the nut or knob, contact is established along the entire edge of the step. Contact along this line does not create a point contact about which the flanges will pivot. Therefore, consistent friction is obtained as increasing tension is applied to the knob and the flanges are brought together.

Regardless of the exact mechanism by which the step operates, empirical tests demonstrate that this step improves the operation of the mechanism when some tension has been applied and the two opposing faces begin to touch one another.

In the preferred embodiment of the present invention, the step is formed in the stationary face. This is the preferred geometry in a tripod head, but there may be situations in which it might be useful to cut a step into the movable face or even both faces. The depth of the step need only be sufficient to avoid contact of the lower peripheries of the two flanges. The depth of the step, however, may be increased, and in the extreme case, the lower portion of either or both flanges can be removed entirely.

DETAILED DESCRIPTION OF THE INVENTION

Figure 3:
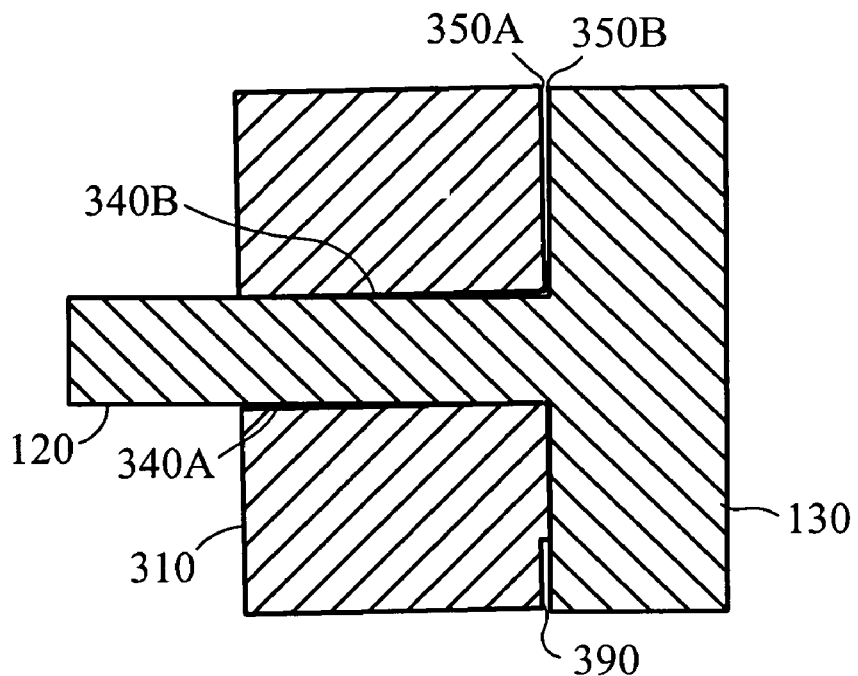
FIG. 3 is a cross-section view of the preferred embodiment of the present invention, where a step has been cut into the stationary flange.
Figure 4:
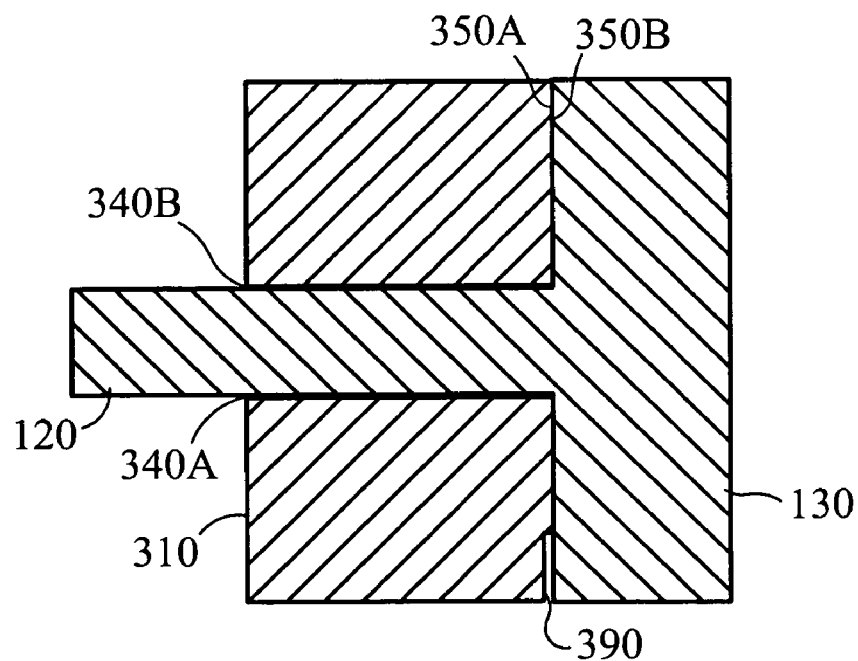
FIG. 4 is a cross-section view of the preferred embodiment of the present invention, where a step has been cut into the stationary flange, illustrating the two flanges fully engaged with one another.

FIG. 3 is a cross-section view of the preferred embodiment of the present invention, where a step 390 has been cut into stationary flange 310. FIG. 4 is a cross-section view of the preferred embodiment of the present invention, illustrating the two flanges 310, 130 fully engaged with one another.

Referring to FIGS. 3 and 4, step 390 has been cut into stationary flange 310. As the two flanges 310, 130 are brought closer to one another by tightening a nut or knob (not shown), contact is established along the edge of step 390, as illustrated in FIG. 3. Contact along this horizontal edge or line does not create a point contact about which flange 310 can pivot. Therefore consistent friction is obtained as increasing tension is applied to the nut (not shown) and flanges 130, 310 are brought together. In FIG. 4, as the nut or other tensioning device is further applied, the two flanges 130, 310 are brought together and the faces 350A, 350B come in contact with each other, preventing relative movement between the two flanges 130, 310.

Regardless of the exact mechanism by which step 390 operates, it is clear from empirical tests that step 390 improves the operation of the mechanism when some tension has been applied and the two opposing faces 350A, 350B begin to touch one another.

Figure 5:
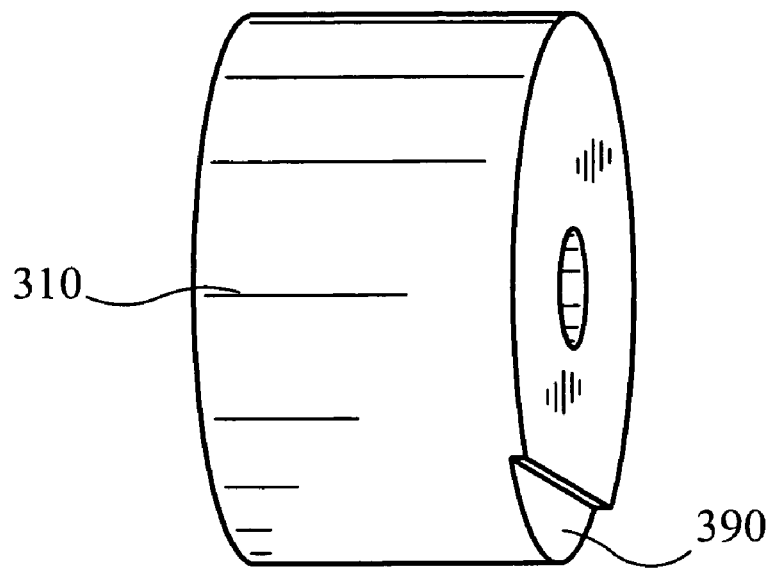
FIG. 5 is a three-dimensional view of the stationary flange of the preferred embodiment of the present invention, illustrating the step cut into the flange.
Figure 6:
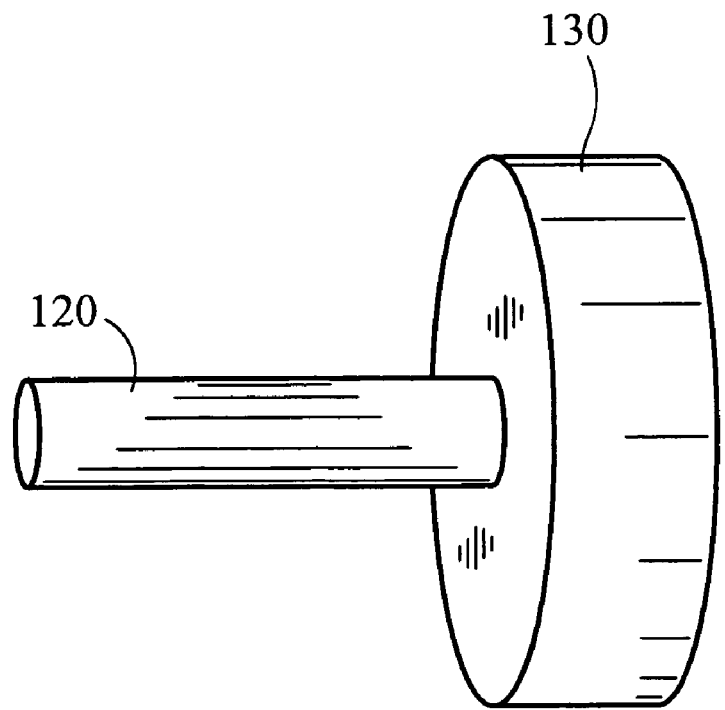
FIG. 6 is a three-dimensional view of the movable flange.

FIG. 5 is a three-dimensional view of stationary flange 310 of the preferred embodiment of the present invention, illustrating step 390 cut into flange 310. FIG. 6 is a three-dimensional view of movable flange 130 with shaft 120, which in this embodiment may be identical to flange 130 and shaft 120 of Prior Art FIGS. 1 and 2. Step 390 in FIGS. 3-5 has been shown on the stationary face. This is the preferred geometry in a tripod head, but there may be situations in which it might be useful to cut a step into the movable face or even both faces. The depth of the step need only be sufficient to avoid contact between the lower peripheries of the two faces.

Figure 1:
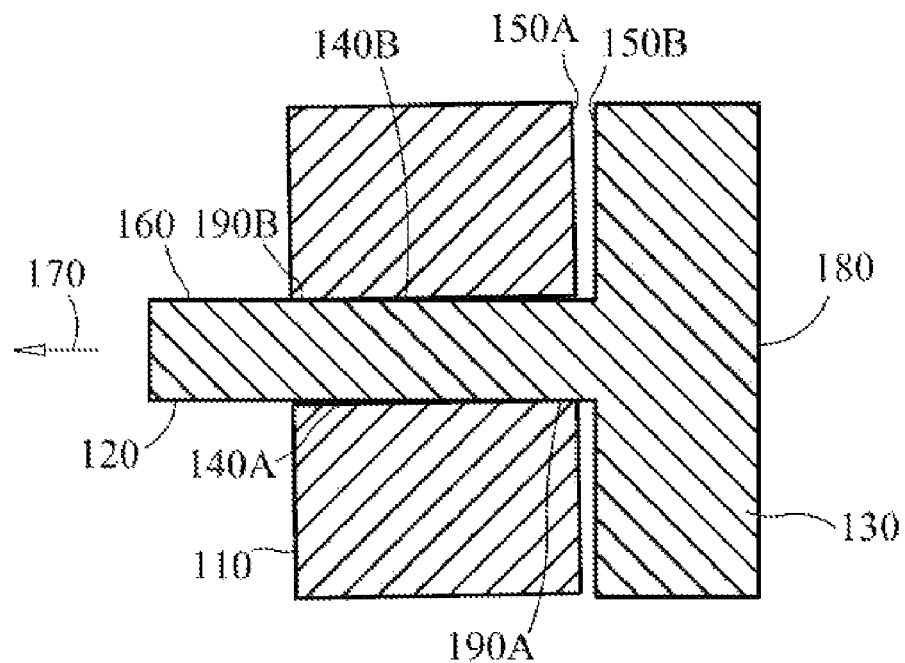
FIG. 1 is a cross-section view of a Prior Art apparatus illustrating the two flanges and connecting shaft.
Figure 2:
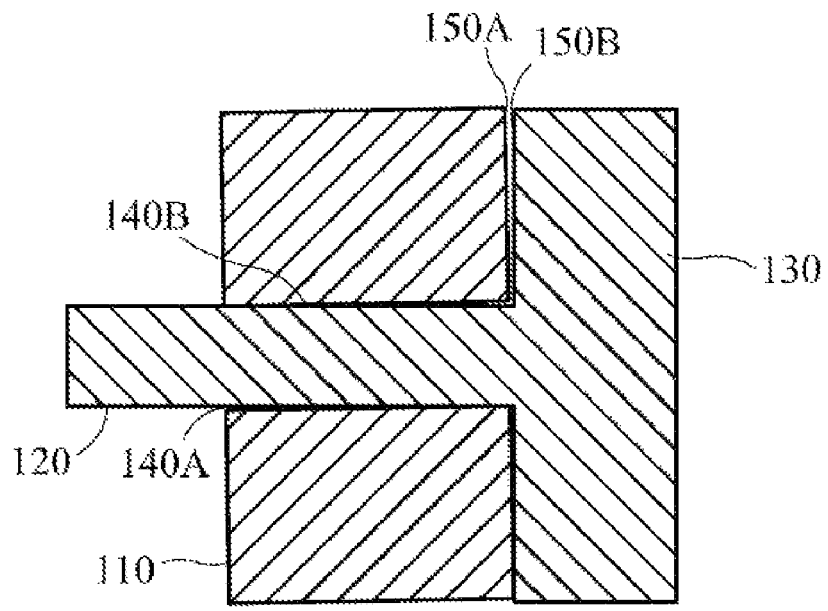
FIG. 2 is a cross-section view of a Prior Art apparatus illustrating the two flanges and connecting shaft, where the two flanges are just touching at the bottom.
Figure 10:
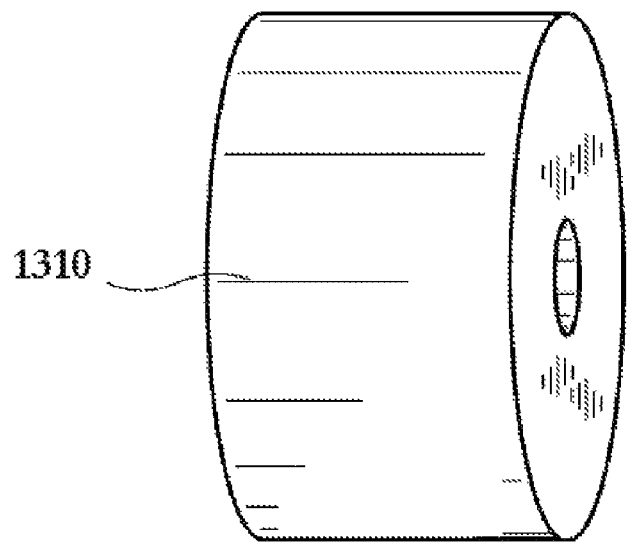
FIG. 10 is a three-dimensional view of the stationary flange of the preferred embodiment of the present invention, with no step cut into the flange.
Figure 11:
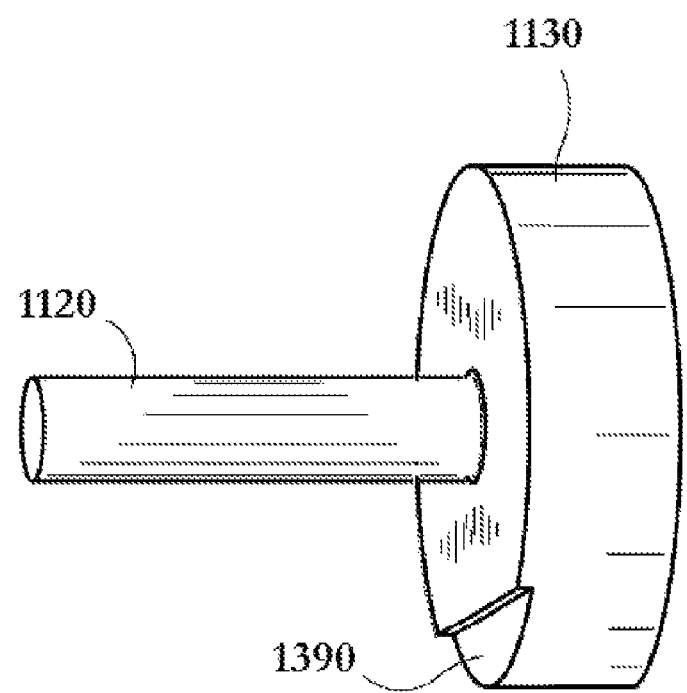
FIG. 11 is a three-dimensional view of the movable flange illustrating a step cut into the flange.

FIG. 10 is a three-dimensional view of the stationary flange 1310 of another embodiment of the present invention, with no step cut into the flange, which in this case may be identical to the stationary flange of Prior Art FIGS. 1 and 2. FIG. 11 is a three-dimensional view of the movable flange 1130 with shaft 1120, illustrating a step 1390 cut into the flange. Step 390 in FIGS. 3-5 have been shown on the stationary face. This is the preferred geometry in a tripod head, but there may be situations in which it might be useful to cut a step into the movable face as illustrated in FIG. 11 or even both faces, by combining the stationary flange of FIG. 5 with the movable flange of FIG. 11. The depth of the step need only be sufficient to avoid contact between the lower peripheries of the two faces.

Figure 7:
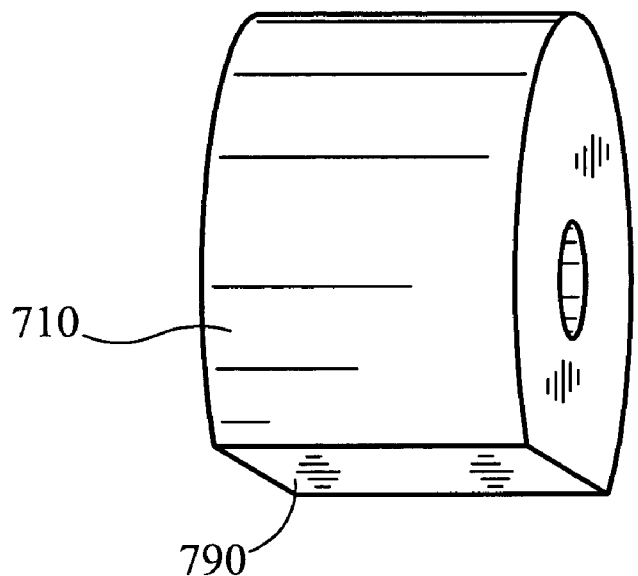
FIG. 7 is a three-dimensional view of the stationary flange in an alternative embodiment of the present invention, illustrating a step cut all the way through the flange.

FIG. 7 is a three-dimensional view of the stationary flange 710 in an alternative embodiment of the present invention, illustrating step 790 cut all the way through flange 710. This embodiment illustrates that the depth of step 790 may be as deep as flange 710 itself, or may be some intermediate depth. In the preferred embodiment, the depth of the step (e.g., step 390 in FIG. 3) is at least deep enough to just avoid contact between surfaces 350A, 350B at their lower peripheries, when the faces are mated as illustrated in FIG. 3. Additional depth may be provided up to and including the cutaway of FIG. 7.

Figure 8:
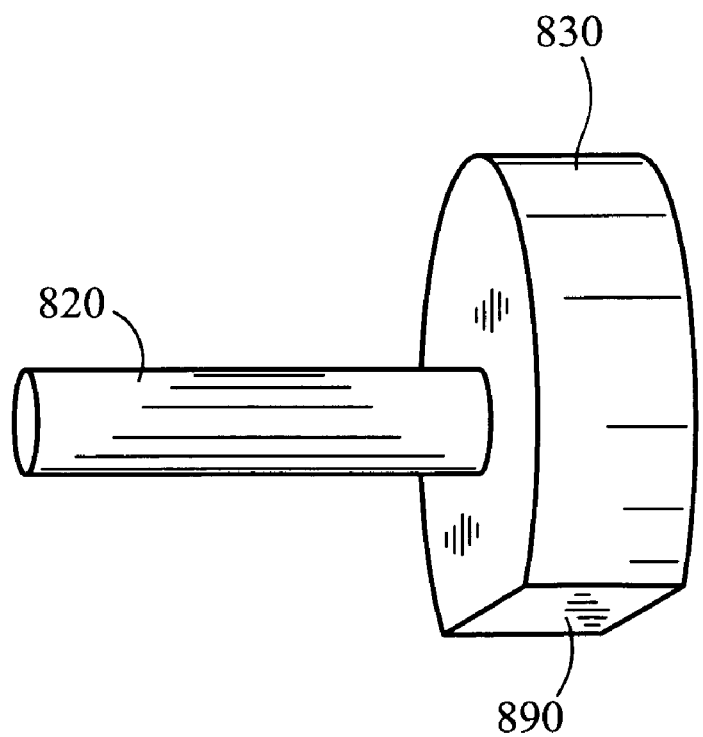
FIG. 8 is a three-dimensional view of the movable flange in an alternative embodiment of the present invention, illustrating a step cut all the way through the flange.

FIG. 8 is a three-dimensional view of a movable flange 830 and shaft 820 in an alternative embodiment of the present invention, illustrating a step 890 cut all the way through movable flange 830. In the embodiment of FIG. 8, a step may be cut similar to a step of FIG. 3, only onto the movable flange 830, as opposed to stationary flange 310. The depth of the step, however, may also be increased, and in the extreme case, a lower portion of movable flange 830 can be removed entirely as illustrated FIG. 8.

While the preferred embodiment and various alternative embodiments of the invention have been disclosed and described in detail herein, it may be apparent to those skilled in the art that various changes in form and detail may be made therein without departing from the spirit and scope thereof.

Figure 9:
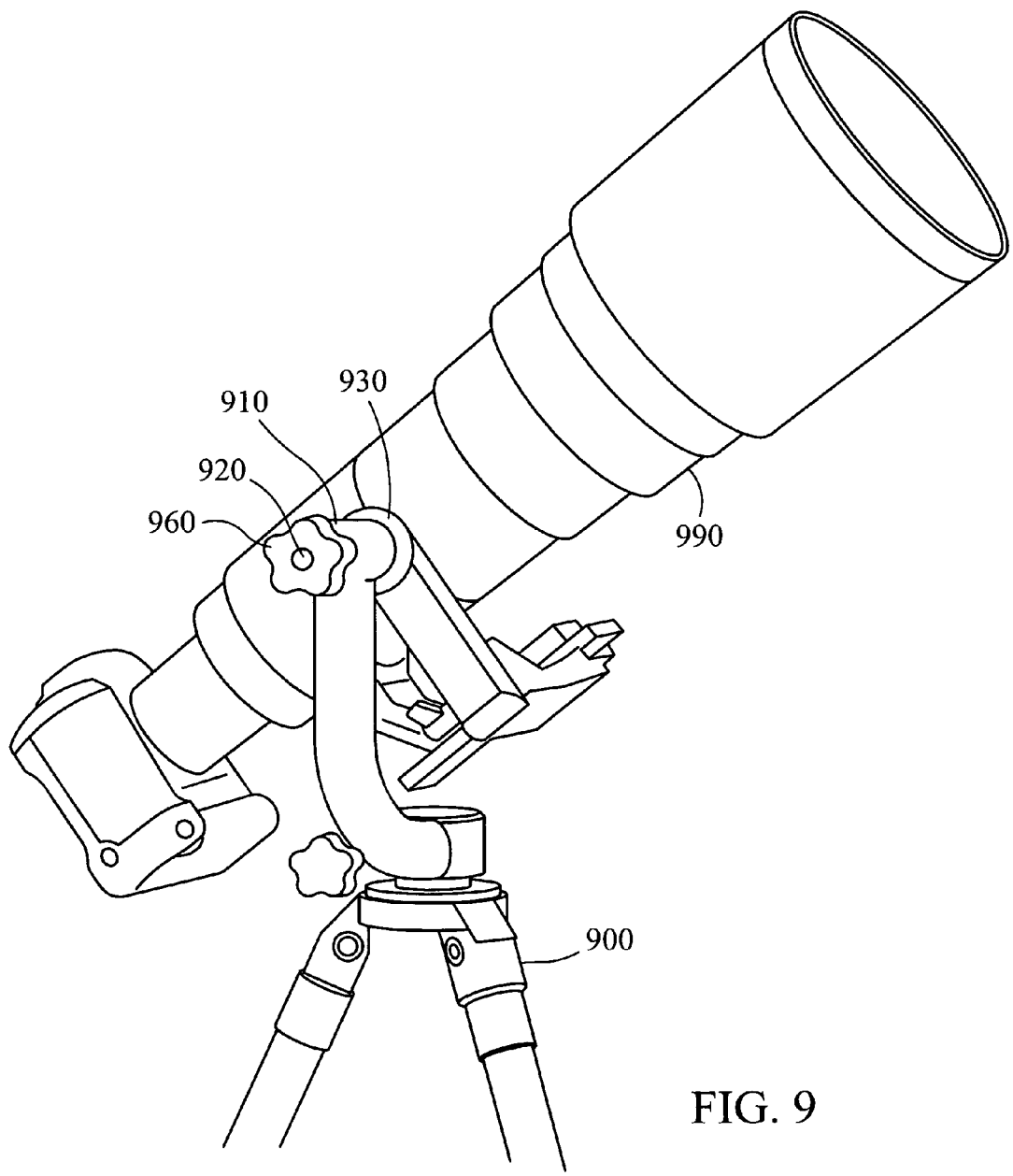
FIG. 9 is an illustration of the apparatus illustrating its field of use.

For example, while in the embodiments illustrated herein, only one step is formed in one of the stationary or movable flanges, it is within the spirit and scope of the present invention to provide steps on both the stationary and movable flanges. In addition, multiple steps may be provided to one or more of the stationary or movable flanges within the spirit and scope of the present invention. Note that the terms "stationary" and "movable" to describe the flanges are used herein to describe the invention in terms of its primary application in the tripod environment of FIG. 9. However, either of the flanges may be made stationary or movable, as dictated by application design, and in some embodiments neither may be entirely stationary.

Note also that in the preferred embodiment, the step cut into the flange creates a linear edge on the mating surface of the stationary flange. However, it is within the spirit and scope of the present invention to provide a step with a non-linear edge. In addition, either of the flanges may have a shape other than circular.

The depth of the step has been previously defined as ranging from an amount needed such that the bottom of the peripheries of the two mating surfaces of the flanges just fail to contact each other when compressed, to a cut all the way through the flange. The location of the step can vary. The step is generally horizontal. In the current application shown in FIG. 9, the step is about half way between the center of the stationary flange and the bottom of that flange. The step can be located near the bottom of the flange, but in this case it would be very small and would not be very effective because it would not be much different from the prior art geometry. The step could be as high as the center of the stationary flange. If it were that high, it would be highly effective because of its great length.

There are disadvantages to raising the location of the step substantially above half way between the bottom of the flange and the center of the flange. If the step is located above the bottom of the shaft, a gap will be developed that can more easily allow contamination into the shaft/bearing area. As tension is applied to the shaft in an effort to bring the faces of the two flanges together, the movable flange pivots around the edge of the step. As the location of the step becomes higher, the location of the pivoting edge becomes higher, and the force required to bring the two flanges together increases. If the step is located at the center of the flange, tightening the mechanism will not result in bringing the two flanges into full contact with one another. The result will simply be that the edge of the step is pressed against the movable flange. This state of affairs may be useful in that a great deal of pressure can be applied through the edge of the step. A disadvantage of this configuration is that the great pressure applied by the edge of the step might permanently damage a washer of softer material that would typically be placed between the two flanges.

Even a step located near the bottom of the flange provides some functionality. On the other hand a step located somewhere between one third of the flange radius above the bottom of a flange to the middle of the flange would probably be most useful in a variety of applications.

The present invention eliminates a regime of low resistance to rotation at the beginning of rotation of a mechanism as depicted in FIG. 2. The current invention accomplishes is this goal with a minimum of manufacturing complexity; a simple step is machined on the stationary flange. Ordinary plain bearings (bushings) can be used. Other means may be employed to achieve the same end. In this low resistance regime, it is necessary that the shaft be able to move very slightly horizontally (perpendicular to the plane of FIG. 2). If the shaft is constrained so that it is not capable of moving horizontally, the need for the step is eliminated. Generally, constraining the shaft, as opposed to cutting a step, would be more difficult to accomplish from a manufacturing perspective.

Various means could be used to accomplish this end. One example would be the substitution of v-block bearings instead of plain bushings. The v-block closest to the movable flange would be oriented with the point of the V down. The v-block on the other end of the stationary flange (where the tightening knob would be) would be oriented with the point of the V up. Various other configurations such as relieving a portion of an ordinary plain bearing could be employed to the same end. The use of very tight fitting bearings, or rolling element bearings would also eliminate the need for a step on the flange. Tight fitting bearings may create unacceptable friction, may wear excessively, and may be difficult or expensive to achieve in an ordinary manufacturing environment. Rolling element bearings are more expensive than plain bearings, are expensive to install and, in the context of the tripod head may have too little resistance to movement and insufficient damping.

I claim:

1. A pivot joint comprising:
a first flange including a planar non-serrated first contiguous flange surface,
a bore, formed in the first flange, the bore having a first diameter and a first bearing surface,
a shaft having a second diameter less than the first diameter, for rotating within the bore, and
a second flange, coupled to the shaft, the second flange including a planar non-serrated second contiguous flange surface for mating to the first flange surface when force is applied to draw the first flange and the second flange together,
wherein one of the first and second flange surfaces has a substantially circular outer edge having a first diameter;
wherein an other of the first or second flange surfaces has an outer edge defined by a first partially circular portion described by a portion of a circle having a second diameter substantially equal to the first diameter, and at least one second, linear edge portion, connecting ends of the first partially circular portion and formed along a chord of the portion of a circle, having a length less than the diameter, the linear edge extending to an outside diameter of the corresponding first or second flanges and not intersecting the shaft or bore, such that as the first flange and second flange are brought closer to one another by a pulling force applied to the shaft, and as the shaft has a second diameter less than the first diameter the first and second flange are not precisely parallel to one another, such that contact between the first and second flange is first established along the edge of the at least one linear edge portion, where the edge of the at least one linear edge portion is formed substantially parallel to a line tangent to the bore, to provide consistent resistance to rotation as the force causes the first flange and the second flange to come into parallel contact with one another, wherein the at least one linear edge portion comprises a step having a depth at least deep enough such that the first flange and the second flange just avoid contact at their lower peripheries when the first flange and second flange are brought into initial contact.

2. The pivot joint of claim 1, wherein the first flange comprises a stationary flange.

3. The pivot joint of claim 2, wherein the second flange comprises a movable flange.

4. The pivot joint of claim 3, wherein the at least one linear edge portion comprises a step formed in the stationary flange.

5. The pivot joint of claim 3, wherein the at least one linear edge portion comprises a step formed in the movable flange.

6. The pivot joint of claim 1, wherein the at least one linear edge portion is cut all the way through a respective one of the first flange and the second flange.

7. The pivot joint of claim 1, wherein the first flange and the second flange have a circular shape, and the at least one linear edge portion has a linear edge.

8. A tripod head for mounting an apparatus including one or more of a camera, telescope, optical instrument, and surveying instrument, the tripod head including a coupler for coupling the tripod head to a tripod, a second coupler for coupling the tripod head to the apparatus, and pivot joint, for allowing the apparatus to pivot along a horizontal axis so as to be adjustable in a vertical plane, the pivot joint comprising:
a first flange including a planar non-serrated first contiguous flange surface,
a bore, formed in the first flange, the bore having a first diameter and a first bearing surface,
a shaft having a second diameter less than the first diameter, for rotating within the bore, and
a second flange, coupled to the shaft, the second flange including a planar non-serrated second contiguous flange surface for mating to the first flange surface when force is applied to draw the first flange and the second flange together,
wherein one of the first and second flange surfaces has a substantially circular outer edge having a first diameter;
wherein an other of the first or second flange surfaces has an outer edge defined by a first partially circular portion described by a portion of a circle having a second diameter substantially equal to the first diameter, and at least one second, linear edge portion, connecting ends of the first partially circular portion and formed along a chord of the portion of a circle, having a length less than the diameter, the linear edge extending to an outside diameter of the corresponding first or second flanges and not intersecting the shaft or bore, such that as the first flange and second flange are brought closer to one another by a pulling force applied to the shaft, and as the shaft has a second diameter less than the first diameter, the first and second flange are not precisely parallel to one another, such that contact between the first and second flange is first established along the edge of the at least one linear edge portion, where the edge of the at least one linear edge portion is formed substantially parallel to a line tangent to the bore, to provide consistent resistance to rotation as the force causes the first flange and the second flange to come into parallel contact with one another,
wherein the at least one linear edge portion comprises a step having a depth at least deep enough such that the first flange and the second flange just avoid contact at their lower peripheries when the first flange and second flange are brought into initial contact.

9. The tripod head of claim 8, wherein the first flange comprises a stationary flange.

10. The tripod head of claim 9, wherein the second flange comprises a movable flange.

11. The tripod head of claim 10, wherein the at least one linear edge portion comprises a step formed in the stationary flange.

12. The tripod head of claim 10, wherein the at least one linear edge portion comprises a step formed in the movable flange.

13. The tripod head of claim 8, wherein the at least one linear edge portion is cut all the way through a respective one of the first flange and the second flange.

14. The tripod head of claim 8, wherein the first flange and the second flange have a circular shape, and the at least one linear edge portion has a linear edge.

* * * * *